United States Patent
Suulivan et al.

(10) Patent No.: US 8,563,079 B2
(45) Date of Patent: Oct. 22, 2013

(54) PLASTIC WELDING USING FIBER REINFORCEMENT MATERIALS

(75) Inventors: Nicole Suulivan, Manchester, CT (US); William Bogue, Hebron, CT (US); Daniel M. Stadtlander, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 477 days.

(21) Appl. No.: 12/480,038

(22) Filed: Jun. 8, 2009

(65) Prior Publication Data

US 2010/0310873 A1    Dec. 9, 2010

(51) Int. Cl.
- *B05D 3/00* (2006.01)
- *B05D 3/02* (2006.01)
- *B32B 43/00* (2006.01)

(52) U.S. Cl.
USPC ............ 427/140; 427/532; 427/226; 427/227

(58) Field of Classification Search
USPC ......... 427/140, 532, 226, 227, 544, 543, 545; 156/94, 166, 296, 321, 322, 62.6, 156/309.6; 428/63
See application file for complete search history.

(56) References Cited

U.S. PATENT DOCUMENTS

| | | | |
|---|---|---|---|
| 2,712,987 A * | 7/1955 | Storrs et al. ...................... 51/293 |
| 4,090,897 A | 5/1978 | Minick | |
| 4,262,744 A * | 4/1981 | Mitchell et al. ............... 166/227 |
| 4,356,230 A * | 10/1982 | Emanuel et al. ............. 442/180 |
| RE32,772 E | 10/1988 | Hawley | |
| 4,859,524 A | 8/1989 | Kim et al. | |
| 5,051,122 A * | 9/1991 | Reese et al. ..................... 65/450 |
| 5,272,809 A | 12/1993 | Robertson et al. | |
| 5,759,927 A * | 6/1998 | Meeker ......................... 442/334 |
| 5,833,435 A | 11/1998 | Smith | |
| 6,042,669 A * | 3/2000 | Craig .............................. 156/94 |
| 6,149,749 A | 11/2000 | McBroom | |
| 7,507,310 B2 | 3/2009 | Manicke et al. | |
| 2006/0198951 A1 * | 9/2006 | Tang et al. .................... 427/140 |
| 2008/0216300 A1 | 9/2008 | Anderson et al. | |
| 2009/0038739 A1 | 2/2009 | Holland et al. | |
| 2009/0065965 A1 | 3/2009 | Bowen | |
| 2009/0246471 A1 * | 10/2009 | Zawacki et al. ............... 428/157 |

FOREIGN PATENT DOCUMENTS

WO    WO2008/119942 A1    10/2008
WO    WO2009/043357 A1    4/2009

OTHER PUBLICATIONS

Extended European Search Report in counterpart foreign Application No. 10250564.1, filed Mar. 24, 2010.

* cited by examiner

*Primary Examiner* — Michael Cleveland
*Assistant Examiner* — Michael Wieczorek
(74) *Attorney, Agent, or Firm* — Kinney & Lange, P.A.

(57) ABSTRACT

A method of reinforcing a thermoplastic part includes softening a portion of the thermoplastic part to form a pool, embedding fibers in the softened pool, and re-solidifying the pool embedded with fibers into a weld that strengthens the thermoplastic part.

18 Claims, 6 Drawing Sheets

US 8,563,079 B2

PLASTIC WELDING USING FIBER REINFORCEMENT MATERIALS

BACKGROUND

The present disclosure relates generally to reinforcement of thermoplastic parts and more specifically, to reinforcement of thermoplastic parts using plastic welding.

Both fiber-reinforced and fiber-free thermoplastic parts are commonly used to assemble an aircraft. Exemplary thermoplastic aircraft parts include fairings, airbrakes, flaps, and wing structures. Damage to a thermoplastic part can occur during assembly, disassembly, or even normal use of the aircraft. Repairs must be made so that the thermoplastic part can function as originally intended. Thermoplastic parts are traditionally repaired by either simplistic thermoplastic welding or secondarily bonding a composite patch over the area of damage. There is no known repair technique that assures a damaged thermoplastic part will be restored to its original serviceable and airworthy condition and therefore, entire thermoplastic parts are often replaced rather than repaired.

SUMMARY

An embodiment of the present disclosure is a method for reinforcing a thermoplastic part. The method includes softening a portion of the thermoplastic part to form a pool of thermoplastic material, embedding fibers in the pool, and re-solidifying the pool embedded with fibers into a reinforced weld that strengthens the thermoplastic part.

The reinforcement method can be used to repair a thermoplastic part having a defect. The repair method includes cleaning the defect and a surrounding portion of the thermoplastic part, embedding fibers in the softened pool, and re-solidifying the pool embedded with fibers into a reinforced weld that repairs the thermoplastic part.

Another embodiment of the present disclosure is a materially heterogeneous thermoplastic part. The thermoplastic part includes a first portion formed by original plastic molding and comprising at least one isotropic material, and a second portion subsequently added to the first portion, wherein the second portion comprises at least one anisotropic material.

DETAILED DESCRIPTION

Figure 1:
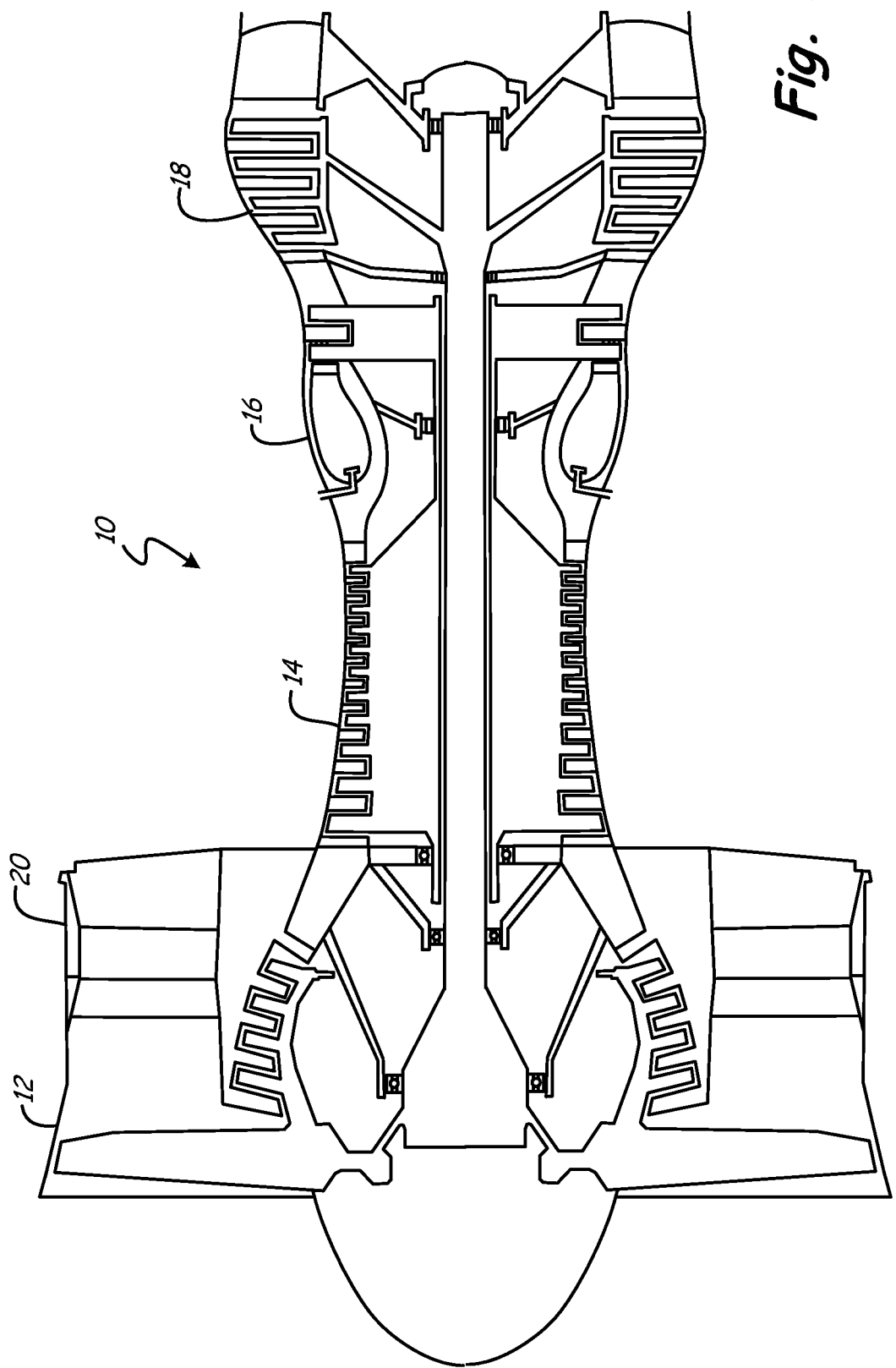
FIG. 1 is a cross sectional view of a gas turbine engine.

FIG. 1 is a cross sectional view of gas turbine engine 10, which includes five main sections which are connected to one another in the following order: inlet fan 12, intermediate case 20, compressor section 14, combustor section 16, and turbine section 18. Air enters gas turbine engine 10 through inlet fan 12 and a portion is directed through intermediate case 20 to the attached compressor section 14. The air is then compressed by a series of rotating blades and static vanes located in compressor section 14. The compressed air is mixed with fuel and ignited in the attached combustor section 16. The resulting combustion exhaust is then directed toward turbine section 18, which also includes blades and vanes. The blades within turbine section 18 extract kinetic energy from the exhaust to turn a shaft (or shafts) thereby providing power to drive inlet fan 12 and compressor section 14. Thrust is provided by inlet fan 12 and the exhaust from turbine section 18.

Figure 2A:
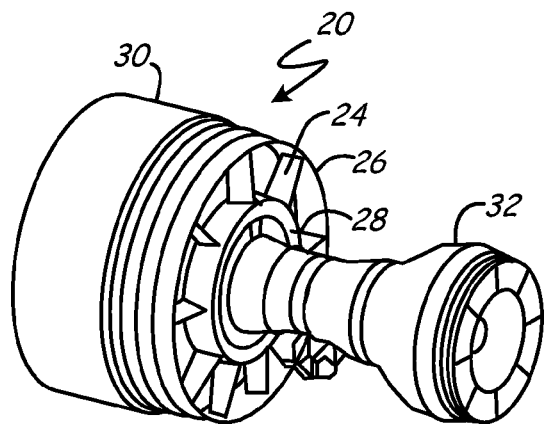
FIG. 2A is an assembled perspective view of an intermediate case and FIG. 2B is an exploded perspective of an intermediate case with fairings exploded away to expose struts.
Figure 2B:
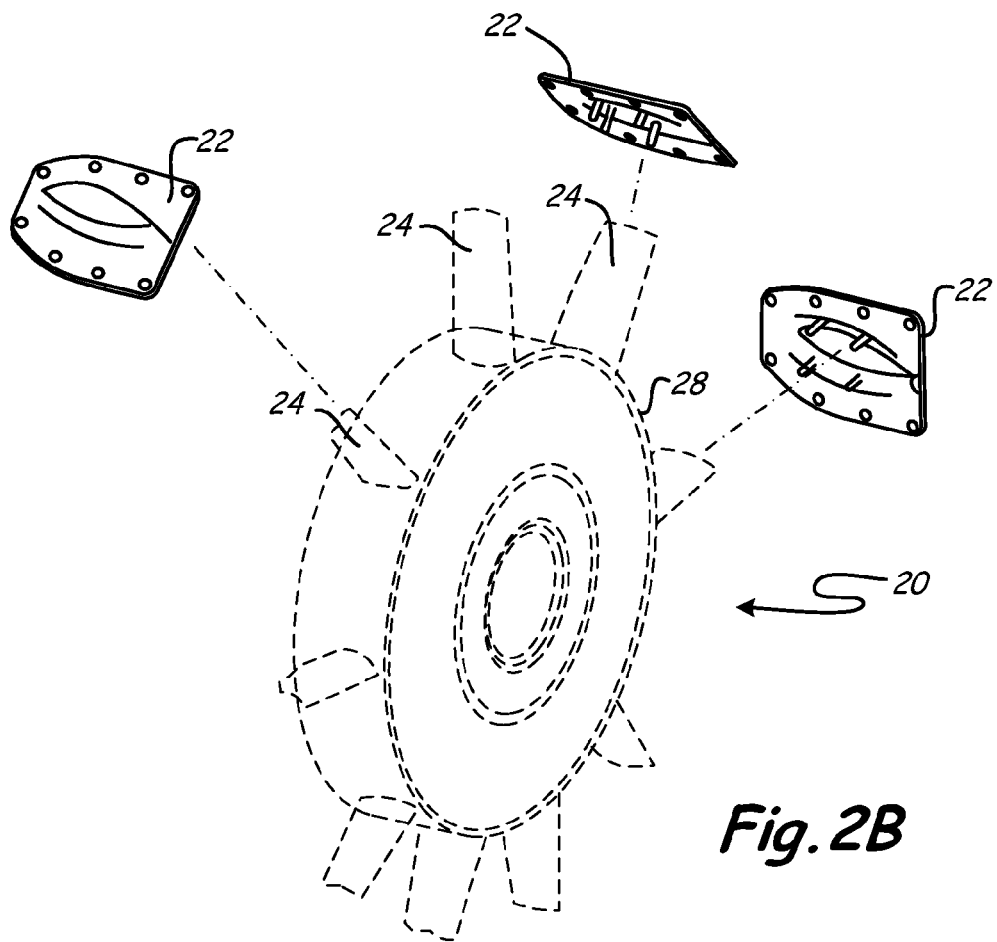

FIG. 2A is an assembled perspective view of intermediate case 20 and FIG. 2B is an exploded perspective view of intermediate case with fairings 22 exploded away to expose struts 24. Depicted in FIGS. 2A and 2B are components of intermediate case 20: fairings 22, struts 24, outer ring 26, inner ring 28, upstream side 30, and downstream side 32. Intermediate case 20 can be used between inlet fan 12 and compressor section 14 of gas turbine engine 10 as described with reference to FIG. 1.

Intermediate case 20 has outer ring 26 surrounding inner ring 28 with fairings 22 and struts 24 extending there between. Fairings 22 each have an aperture so that fairings can slide over and surround struts 24. Struts 24 resemble the spokes of a wheel having a first end attached to inner ring 28 and extending radially outward to have a second end attached to outer ring 26. Once assembled, fairings 22 reinforce the first end of struts 24 adjacent inner ring 28. Upstream side 30 of intermediate case is connected to fan inlet case 12 and downstream side 32 of intermediate case is connected to compressor section 14 as depicted in FIG. 1.

Fairings 22 are usually bolted around struts 24 and help direct air flowing through intermediate case 20. Outer ring 26 and inner ring 28 support the spoke configuration of fairings 22. Outer ring 26, upstream side 30, and downstream side 32 all provide attachment locations for attaching intermediate case 20 to surrounding components of gas turbine engine 10.

Fairings 22, as well as a multitude of other gas turbine engine 10 components, can be initially constructed of non-reinforced thermoplastic (fiber-free) or reinforced thermoplastic (containing fibers). As known in the art, structural fabrics, such as strands of glass, can be submerged within thermoplastic resin, such as nylon. Each strand of glass is actually a bundle of very fine fibers, which are encapsulated and thoroughly "wet-out" by a thermoplastic polymer matrix to increase thermoplastic strength. Regardless of whether fairing 22 is originally molded from homogenous non-reinforced or homogenous reinforced thermoplastic, fairing 22 is bound to experience damage during its lifetime. Fairings 22 can be damaged during assembly or disassembly of intermediate case 20, or even during normal use. Erosion and foreign objects are cited as common causes of damage at a leading edge of fairings 22.

Due to the high cost of fairing replacement, fairings 22 are typically repaired by either simplistic hot thermoplastic welding without reinforcement or secondarily bonding a composite patch over the damaged surface with a thermoset adhesive such as epoxy. Neither of these repair methods restore fairings 22 to their original strength and durability. Typical thermoplastic welding techniques keep thermoplastic part materially homogenous and significantly decrease fairing 22 strength. Secondarily bonded composite patches are also inadequate because they tend to become liberated in use. A more materially robust and cosmetically acceptable method of repairing fairings 22 is desirable.

Figure 3:
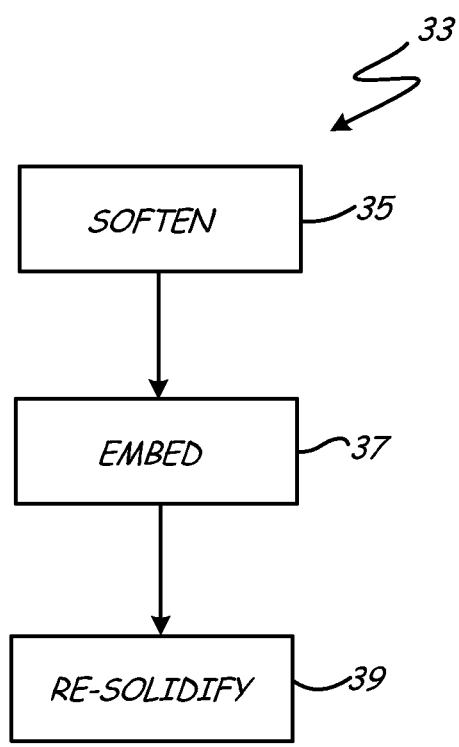
FIG. 3 is a flow chart describing a method for reinforcing thermoplastic parts according to the present disclosure.
Figure 4:
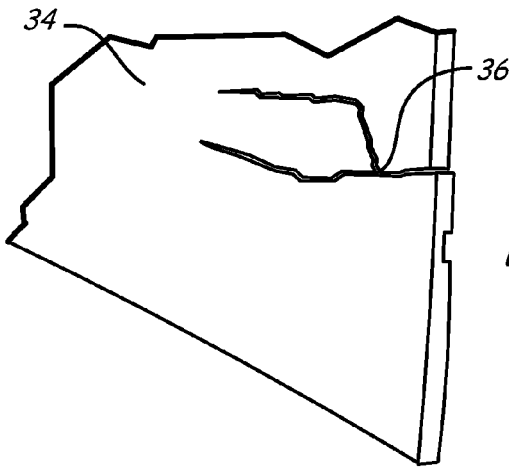
FIG. 4 is a perspective view of a thermoplastic part having a discontinuity defect.

The present disclosure teaches a method of reinforcing thermoplastic parts, such as fairings 22, by using reinforcing fibers and plastic welding. Thermoplastic parts may be reinforced prior to incurring any structural damage as a preventative measure and/or structural damage may be repaired while the thermoplastic part is simultaneously reinforced. FIG. 3 is a flow-chart describing a method of reinforcing thermoplastic parts in accordance with the present disclosure. FIG. 4 depicts a damaged thermoplastic part, and FIG. 9 depicts a repaired thermoplastic part. FIGS. 5-8 depict a first embodiment of the welding technique using thermal or vibratory welding methods, and FIGS. 9-12 depict a second embodiment of the welding technique using solvent welding method. For the sake of brevity and simplicity, FIGS. 4-12 describe a method for repairing a thermoplastic part having a defect, although it is appreciated that the methods described may also be employed preemptively to reinforce a thermoplastic part that lacks any structural deformity or to join together two distinct thermoplastic parts.

FIG. 3 is a flow-chart describing method 33 for reinforcing a previously homogeneous thermoplastic part. Method 33 generally includes softening a portion of the thermoplastic part to form a pool of thermoplastic material (step 35), embedding fibers in the pool (step 37), and re-solidifying the pool embedded with fibers into a reinforced weld that strengthens the thermoplastic part (step 39). More specific applications of method 33 are described below.

FIG. 4 is a perspective view of thermoplastic part 34 having defect 36. Thermoplastic part 34 is materially homogenous, has isotropic properties, and may be either reinforced with fillers or fibers, or may be un-reinforced. For example, thermoplastic part 34 can be formed from a nylon thermoplastic. In the shown embodiment, defect 36 is a discontinuity or crack extending into thermoplastic part 34 from a side surface and extending through an entire height of the thermoplastic part 34 from a top surface to a bottom surface. It is equally possible for defect 36 to be an area of thinning, a void, a chip, a hole, or a dent in thermoplastic part 34.

Method 33 from FIG. 3 can be applied to repair defect 36 in thermoplastic part 34 using an energy source (i.e. heat or vibration) and is summarized as follows. First, defect 36 and a surrounding portion of thermoplastic part 34 are cleaned. Second, defect 36 is softened by application of the energy source (i.e. heat or vibration) to form a pool of thermoplastic (step 35). Third, fibers are embedded in the softened pool (step 37). Fourth, the energy source (i.e. heat or vibrations) is removed from the softened pool embedded with fibers so that the pool re-solidifies into a reinforced weld that repairs defect 36 (step 39). If desired, the weld in thermoplastic part 34 can be finished by covering the weld with additional filler material to form a patch, removing excess filler material so the patch is substantially level with surrounding thermoplastic part 34, polishing the patch to a smooth finish, and coating the patch with paint. The above-recited embodiment of method 33 is depicted in FIGS. 5-8.

Figure 5:
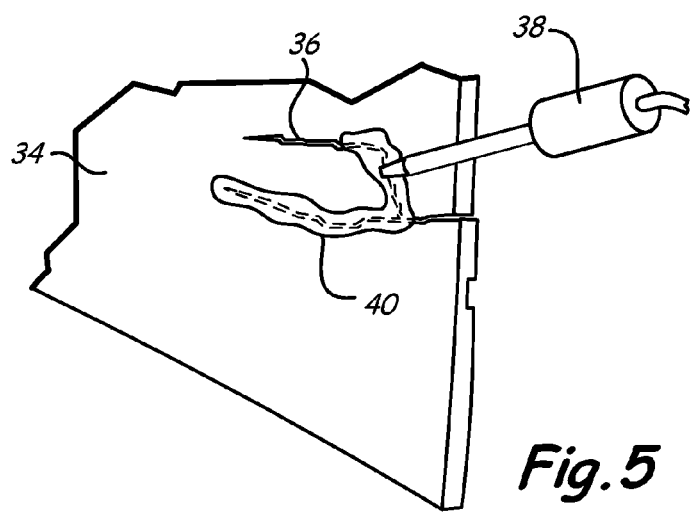
FIG. 5 is a perspective view of a soldering iron softening the defect from FIG. 4 into a pool of thermoplastic material.

FIG. 5 is a perspective view of soldering iron 38 softening defect 36 to form pool 40 (step 35). Prior to use of soldering iron 38, defect 36 and a portion of thermoplastic part 34 surrounding defect 36 are thoroughly cleaned of debris. Surface contaminants can be removed by wiping a solvent over thermoplastic part 34, degreasing thermoplastic part 34, and/or rinsing thermoplastic part 34 in hot water. After cleaning, a tip of soldering iron 38 is placed in contact with defect 36 and the portion of thermoplastic part 34 surrounding defect 36. Heat from soldering iron 38 causes defect 36 and surrounding thermoplastic part 34 to soften, liquefy, and/or fuse and form softened pool 40. It should be appreciated that soldering iron 38 is provided as an exemplary energy source using heat to soften defect 36, although use of alternative energy sources such as those providing vibrations are equally possible.

Figure 6:
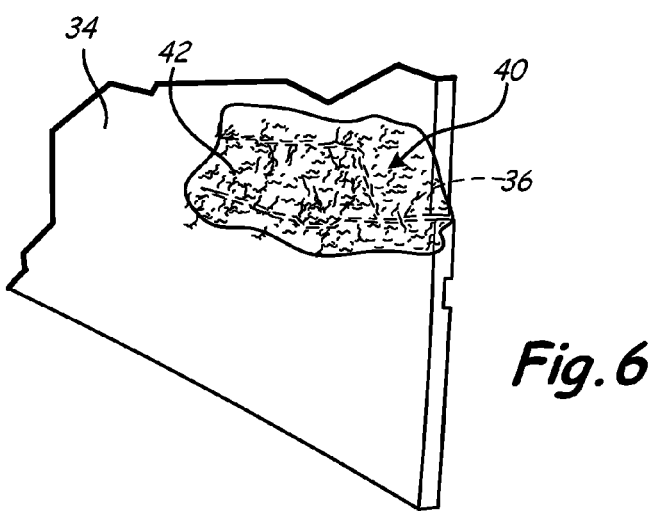
FIG. 6 is a perspective view of fibers embedding within the softened pool from FIG. 5.

FIG. 6 is a perspective view of fibers 42 embedding within softened pool 40 of thermoplastic (step 37). After the formation of softened pool 40, fibers 42 are added to, and embedded within, softened pool 40 to bridge defect 36. Fibers 42, as used herein, includes loose fibers as well as woven and non-woven fabrics having anisotropic properties. Fibers 42 can either be added alone or added into softened pool 40 after being pre-disbursed with thermoplastic resin. Pre-disbursement of fibers 42 can be accomplished by thermal or solvent techniques known in the art. Pressure from soldering iron 38 or another instrument can help force fibers 42 into full submersion and saturation within softened pool 40. Soldering iron 28 can be run along a top or a bottom surface of part 34 to sufficiently heat the portion of thermoplastic part 34 surrounding defect 36. Unlike thermoset materials, thermoplastic part 34 can be melted and cooled repeatedly, allowing the present welding technique of heating defect 36 to form softened pool 40 and embedding fibers 42 into softened pool 40 to be used repeatedly while moving across a large defect 36 and/or a large thermoplastic part 34.

Figure 7:
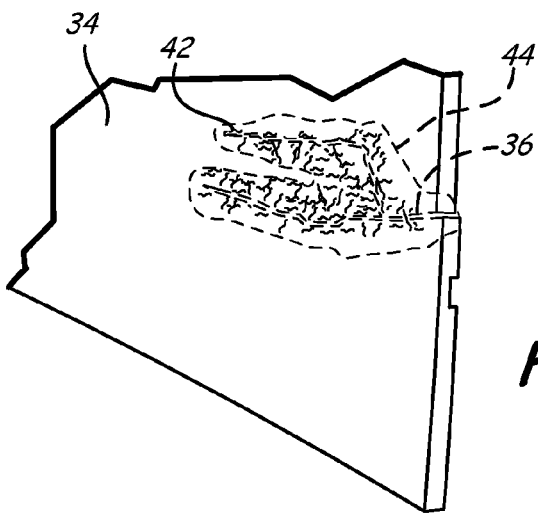
FIG. 7 is perspective view of the softened pool with embedded fibers from FIG. 6 cooling and thereby re-solidifying to form a reinforced weld.

FIG. 7 is a perspective view of softened pool 40 with embedded fibers 42 re-solidifying to form reinforced weld 44 (step 39). Removing soldering iron 38 from contact with softened pool 40 causes softened pool 40 to re-solidify into reinforced weld 44, thereby impregnating fibers 42 within weld 44. The defect 36 of thermoplastic part 34 repaired by weld 44 is reinforced by fibers 42 and will display structural integrity lacking in the prior art. If desired, finishing techniques can be used to cover weld 44 and give repaired thermoplastic part 34 a uniform appearance.

Figure 8:
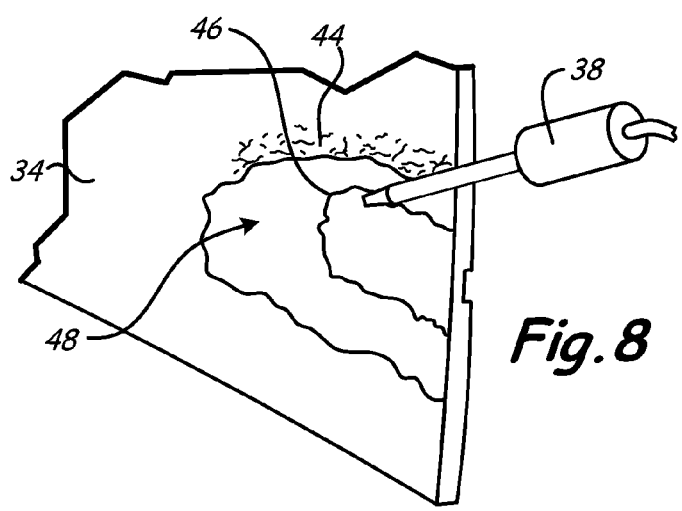
FIG. 8 is a perspective view of the soldering iron and additional filler material fully encapsulating the welded fibers from FIG. 7 and filling surface voids.
Figure 9:
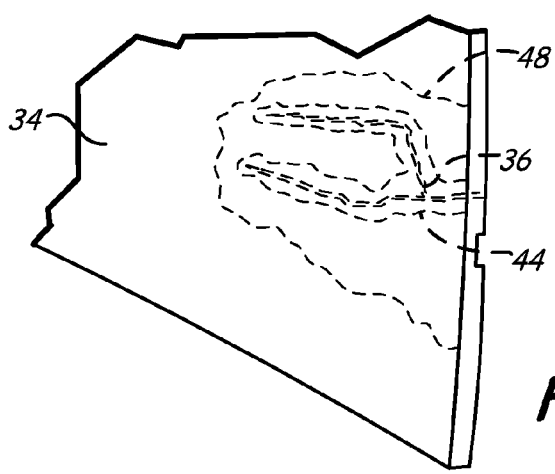
FIG. 9 is a perspective view of the thermoplastic part from FIG. 4 after repair and finishing.

FIG. 8 is a perspective view of soldering iron 38 and filler material 46 forming patch 48 over weld 44. Filler material 46 can be the same material as thermoplastic part 34 or any other suitable material. Soldering iron 38 melts filler material 46 over weld 44 to form patch 48. Removing soldering iron 38 and its associated heat allows patch 48 to solidify over weld 44. If desired, excess filler material 46 can be removed from patch 48 by grinding or any other removal processes to make surface of part 34 flush and aerodynamic. Patch 48 can also be buffered, polished, and/or coated with paint as desired.

FIG. 9 is a perspective view of thermoplastic part 34 after repair and finishing. As shown, defect 36 is repaired by fiber-reinforced weld 44, which is covered by patch 48, which is finished to match surrounding thermoplastic part 34. The repaired thermoplastic part 34 has at least two materially heterogeneous portions: a first portion formed by original plastic molding, which comprises at least one isotropic material, and a second portion subsequently added to the first portion. The second portion added by plastic welding and embedded with fibers, therefore comprising at least one anisotropic material.

Method 33 can also be use to repair defect 36 in thermoplastic part 34 using a solvent and is summarized as follows. First, defect 36 and a surrounding portion of thermoplastic part 34 are cleaned. Second, a solvent is applied to defect 36 to form a softened pool of thermoplastic (step 35). Third, fibers 42 are embedded in the softened pool (step 37). Fourth, the solvent is allowed to evaporate from the softened pool embedded with fibers 42 so that the pool re-solidifies into a reinforced weld that repairs defect 36 (step 39). If desired, weld in thermoplastic part 34 can be finished by covering the weld with additional filler material to form a patch, removing excess filler material so the patch is substantially level with surrounding thermoplastic part 34, polishing the patch to a smooth finish, and coating the patch with paint. The above-recited method is depicted in FIGS. 10-12.

Figure 10:
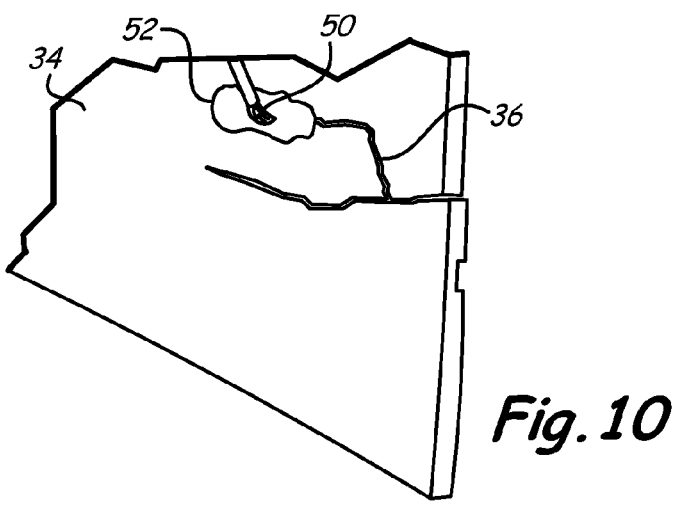
FIG. 10 is a perspective view of a solvent softening the defect from FIG. 4 into a pool of thermoplastic material.

FIG. 10 is a perspective view of solvent 50 softening, liquefying, and/or fusing defect 36 to form softened pool 52 of thermoplastic (step 35). Beginning over again with thermoplastic part 34 having defect 36 as shown in FIG. 4, defect 36 and a portion of thermoplastic part 34 surrounding defect 36 are cleaned. After removing surface debris through cleaning techniques described above, solvent 50 is applied to defect 36. Solvent 50 causes defect 36 and the surrounding portion of thermoplastic part 34 to soften and form pool 52 of thermoplastic.

Figure 11:
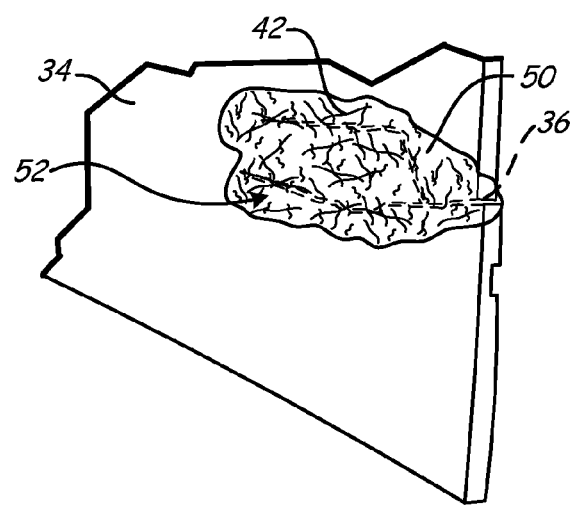
FIG. 11 is a perspective view of fibers embedding within softened pool from FIG. 10.

FIG. 11 is a perspective view of fibers 42 embedding within softened pool 52 (step 37). After the formation of softened pool 52 with solvent 50, fibers 42 are added into softened pool 52. As described above, fibers 42 can be introduced alone into softened pool 52 or added pre-disbursed with thermoplastic. A tool can be used to exert pressure on fibers 42 and encourage full saturation and wetting-out of fibers 42 within softened pool 52. Exemplary solvents for use as solvent 50 include toluene, xylene, trichlorethylene, methylene chloride, chlorobenzene, tetrahydrofuran, methylethylketone, and cyclohexanone.

Figure 12:
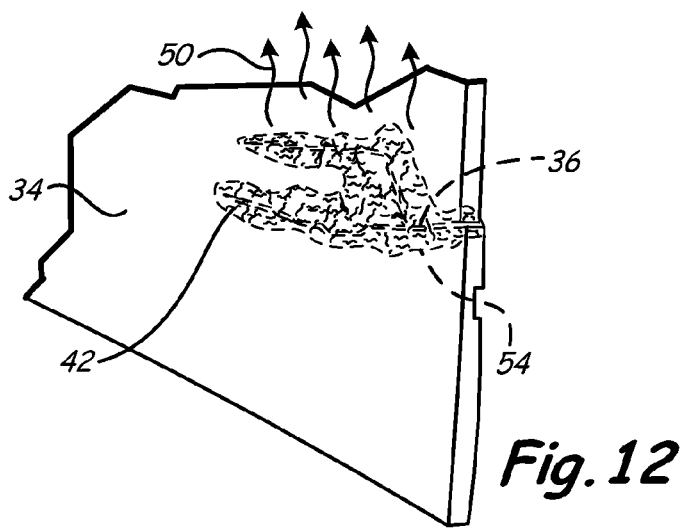
FIG. 12 is a perspective view of the solvent evaporating away from the softened pool with embedded fibers from FIG. 11 thereby re-solidifying to form a reinforced weld.

FIG. 12 is a perspective view showing solvent 50 evaporating away from softened pool 52 with embedded fibers 42. As solvent 50 evaporates, softened pool 52 with embedded fibers 42 re-solidifies to form reinforced weld 54 (step 39). Weld 54 is reinforced by fibers 42 so that the area once having defect 36 is replaced by reinforced and structurally sound weld 54 As described above with reference to weld 44, weld 54 can be patched, ground, polished, and/or painted to give repaired thermoplastic part 34 a uniform appearance.

Although the present invention has been described with reference to preferred embodiments, workers skilled in the art will recognize that changes may be made in form and detail without departing from the spirit and scope of the invention.

The invention claimed is:

1. A method for repairing a thermoplastic part having a defected location requiring reinforcement, the method comprising:
    softening a portion of the thermoplastic part including the defected location requiring reinforcement to form a homogenous pool of thermoplastic parent material;
    embedding loose fibers in the softened pool such that the loose fibers are encapsulated by the thermoplastic parent material; and
    re-solidifying the pool embedded with encapsulated fibers into a reinforced weld that repairs and strengthens the thermoplastic part.

2. The method of claim 1, further comprising:
    covering the weld with filler material to form a patch.
3. The method of claim 2, further comprising:
    removing excess filler material so the patch is substantially level with surrounding portions of the thermoplastic part.
4. The method of claim 3, further comprising:
    polishing the patch to a smooth finish.
5. The method of claim 4, further comprising:
    coating the patch with paint.
6. The method of claim 1, wherein softening a portion of the thermoplastic part into a homogenous pool of thermoplastic parent material includes applying an energy source to the defected location requiring reinforcement.
7. The method of claim 6, wherein re-solidifying the pool embedded with encapsulated fibers into a reinforced weld that strengthens the defected location requiring reinforcement includes removing the energy source from the pool.
8. The method of claim 1, wherein softening a portion of the thermoplastic part into a homogenous pool of thermoplastic parent material includes applying a solvent to the defected location requiring reinforcement.
9. The method of claim 8, wherein re-solidifying the pool embedded with encapsulated fibers into a reinforced weld that repairs and strengthens the thermoplastic part includes evaporating the solvent away from the pool.
10. The method of claim 1, further comprising:
    pre-saturating the fibers in a thermoplastic resin before embedding the fibers into the softened pool.
11. A method for repairing a thermoplastic part having a defect, the method comprising:
    cleaning the defect and a surrounding portion of the thermoplastic part;
    softening the defect and surrounding portion of the thermoplastic part to form a pool of thermoplastic material;
    embedding loose fibers in the softened pool such that the loose fibers are encapsulated by the thermoplastic material; and
    re-solidifying the pool embedded with encapsulated fibers into a reinforced weld that that repairs and strengthens the thermoplastic part.
12. The method of claim 11, wherein softening the defect and surrounding portion of the thermoplastic part into a pool of thermoplastic material includes applying an energy source to the defect.
13. The method of claim 12, wherein re-solidifying the pool embedded with encapsulated fibers into a reinforced weld that repairs and strengthens the defect includes removing the energy source from the softened pool.
14. The method of claim 13, wherein the energy source is one of heat and vibration.
15. The method of claim 11, wherein softening the defect and surrounding portion of the thermoplastic part into a pool of thermoplastic material includes applying a solvent to the defect.
16. The method of claim 15, wherein re-solidifying the softened pool embedded with encapsulated fibers into a reinforced weld that repairs and strengthens the thermoplastic part includes evaporating the solvent away from the pool.
17. The method of claim 11, wherein the thermoplastic part comprises a fairing for use in an intermediate case of a gas turbine engine.
18. The method of claim 11, further comprising:
    pre-saturating the fibers in a thermoplastic resin before embedding the fibers into the softened pool.

* * * * *